United States Patent
Shigeta et al.

(10) Patent No.: US 7,487,028 B2
(45) Date of Patent: Feb. 3, 2009

(54) DEVICE AND METHOD FOR EVALUATING LOW-μ ROAD AND POWER DISTRIBUTION CONTROL DEVICE FOR FOUR-WHEEL DRIVE VEHICLES

(75) Inventors: Ryouhei Shigeta, Kariya (JP); Tsuyoshi Murakami, Kariya (JP)

(73) Assignee: JTEKT Corporation, Osaka (JP)

( * ) Notice: Subject to any disclaimer, the term of this patent is extended or adjusted under 35 U.S.C. 154(b) by 826 days.

(21) Appl. No.: 10/846,960

(22) Filed: May 13, 2004

(65) Prior Publication Data
US 2005/0004741 A1  Jan. 6, 2005

(30) Foreign Application Priority Data
May 19, 2003  (JP) .............................. 2003-140941

(51) Int. Cl.
  *B60T 7/12* (2006.01)
  *G06F 17/00* (2006.01)
  *G06F 7/00* (2006.01)

(52) U.S. Cl. .............................. 701/90; 701/74; 701/88; 701/89

(58) Field of Classification Search .................... 701/81, 701/73, 69, 90, 91, 89, 88, 87, 82, 74; 303/149, 303/150
See application file for complete search history.

(56) References Cited

U.S. PATENT DOCUMENTS

| | | | | |
|---|---|---|---|---|
| 5,411,325 A | * | 5/1995 | Tanaka et al. | 303/150 |
| 5,443,583 A | * | 8/1995 | Sugawara et al. | 303/169 |
| 5,765,657 A | * | 6/1998 | Fukumura et al. | 180/197 |
| 5,996,719 A | * | 12/1999 | Galli | 180/233 |
| 6,125,319 A | * | 9/2000 | Hac et al. | 701/80 |
| 6,543,278 B1 | * | 4/2003 | Kogure | 73/146 |
| 6,650,988 B2 | * | 11/2003 | Kawasaki et al. | 701/80 |
| 2002/0120383 A1 | * | 8/2002 | Miyazaki | 701/80 |

FOREIGN PATENT DOCUMENTS

JP  11-148395 A1  6/1999

OTHER PUBLICATIONS

Patent Abstracts of Japan for JP11-148395 published on Jun. 2, 1999.

\* cited by examiner

*Primary Examiner*—Thomas G Black
*Assistant Examiner*—Christine M Behncke
(74) *Attorney, Agent, or Firm*—Darby & Darby P.C.

(57) ABSTRACT

A power distribution control device 42 calculates a low-μ information magnitude, associated with the friction coefficient of the road surface, based on the slip rate and the vehicle acceleration operation magnitude. If the low-μ information magnitude exceeds an addition evaluation threshold, the power distribution control device 42 adds the low-μ information magnitude. If the low-μ information magnitude does not exceed the addition evaluation threshold, the power distribution control device 42 subtracts a constant K from a counter. The power distribution control device 42 makes evaluates a road to have a low-μ when the counter exceeds a low-μ evaluation threshold.

10 Claims, 4 Drawing Sheets

DEVICE AND METHOD FOR EVALUATING LOW-μ ROAD AND POWER DISTRIBUTION CONTROL DEVICE FOR FOUR-WHEEL DRIVE VEHICLES

INCORPORATION BY REFERENCE

The present application claims priority under 35 U.S.C. §119 to Japanese Patent Application No. 2003-140941 filed on May 19, 2003. The content of the application is incorporated herein by reference in its entirety.

BACKGROUND OF THE INVENTION

The present invention relates to a device and method for evaluating low-μ road evaluation and a power distribution control device for four-wheel drive vehicles.

In a conventional method for evaluating low-μ roads, the wheel speed is detected, a slip rate for the wheels is calculated, a friction coefficient of the road surface based on the slip rate is estimated, and a low-μ road evaluation is performed based on the friction coefficient (conventional structure 1). In another method (conventional structure 2), the friction coefficient of the road surface is estimated solely on the basis of the driver's acceleration operation magnitude, and a low-μ evaluation is performed based on this road surface friction coefficient. "μ" here refers to the friction coefficient.

Japanese laid-open patent publication number Hei 11-148395 shows an example of a technology for performing low-μ road evaluations based on the slip rate and the accelerator setting (conventional structure 3). In this technology, each time the accelerator is operated, a slip count for when the slip rate exceeds a predetermined value is recorded, and a low-μ road evaluation is made when the counter for the acceleration operation exceeds a predetermined threshold value set up for each acceleration operation.

However, with a technology such as the conventional structure 1 that performs low-μ road evaluation based simply on the slip rate, evaluation errors can take place such as a low-μ road evaluation being made on a dry road surface when a sudden acceleration operation is performed to get the maximum throttle setting.

With a technology such as the conventional structure 2 that estimates the friction coefficient of a road surface based solely on the acceleration operations of the driver, evaluation errors can take place because of variations in the driver's acceleration operations.

Among four-wheel drive vehicles, stand-by four-wheel drive systems are well known. Stand-by systems switch between a four-wheel drive state and a two-wheel drive state as necessary and are equipped with a primary driving wheel connected directly to the internal combustion engine and a secondary driving wheel (also referred to as a driven wheel) connected to the internal combustion engine by way of a coupling. The power distribution to the secondary driving wheel is adjusted to provide an optimum setting by varying the coupling strength (engagement strength) according to the road surface state, the driving state, and the like.

In a four-wheel drive vehicle equipped with a low-μ road evaluation device as described above, four-wheel drive control is provided when there is a low-μ road evaluation and two-wheel drive control is provided when there is a high-μ road evaluation.

However, there are cases when stable control does not take place, such as when there is a road having low-μ surface scattered over it, e.g., a dry road with patches of snow. In this case, low-μ road evaluations and high-μ road evaluations would take place frequently, switching from one to the other at short intervals so that four-wheel drive control and two-wheel drive control would take place accordingly.

The conventional structure 3 seeks to overcome this problem by disabling low-μ road evaluation when slips in which the slip rate does not exceed a predetermined value take place consecutively a predetermined number of times (this is referred to as disabling method 1). Alternatively, the low-μ road evaluation is disabled when there is a continuous slip in which the slip rate does not exceed the predetermined value (this is referred to as disabling method 2).

However, the disabling method 1 and the disabling method 2 of the conventional structure 3 are not performed according to the magnitude of the friction coefficient. Thus, it is possible for low-μ road evaluation to be disabled regardless of the magnitude of the friction coefficient.

SUMMARY OF THE INVENTION

The object of the present invention is to overcome the problems described above. A low-μ road evaluation device with improved low-μ road evaluation allows low-μ road evaluation to be disabled based on the friction coefficient of the Low-μ road so that frequent alternations between low-μ road evaluations and high-μ road evaluations do not take place even when there are alternating patches of low-μ road surfaces and high-μ road surfaces.

According to another aspect, the present invention provides a power distribution control device for four-wheel drive vehicles that is equipped with the low-μ road evaluation device described above so that stable four-wheel drive control can be performed according to the friction coefficients of low-μ roads.

In order to achieve the objects described above, an implementation of a low-μ road evaluation device includes: slip rate calculating means for calculating a slip rate between a wheel of a vehicle and a road surface; low-μ information magnitude calculating means for calculating a low-μ information magnitude associated with a friction coefficient of the road surface, based on the slip rate and an acceleration operation magnitude derived from a sensor in the vehicle; comparison evaluating means for comparing between the calculated low-μ information magnitude and a first preset threshold value; adding means for adding a value based on the low-μ information magnitude to a counter when the comparison evaluating means determines that the low-μ information magnitude exceeds the first preset threshold value; subtracting means for subtracting a predetermined value from the counter added to by the adding means when the comparison evaluating means determines that the low-μ information magnitude does not exceed the first preset threshold value; and low-μ road evaluating means for determining that there is a low-μ road when the counter calculated by the adding means or the subtracting means exceeds a second preset threshold value.

Another implementation of the invention provides a low-μ road evaluation device but further includes acceleration operation magnitude detecting means for detecting an acceleration operation magnitude of the vehicle.

Still Another implementation of the invention provides a low-μ road evaluation device in which the low-μ information magnitude is a variable value based on the acceleration operation magnitude and the slip rate.

Another implementation of the invention provides a low-μ road evaluation device in which the predetermined amount is a constant.

Still another implementation of the invention provides a power distribution control device for four-wheel drive vehicles in which controlling means controls a coupling force that transfers power generated by an internal combustion engine to front and rear wheels, based on driving conditions of said vehicle. The power distribution control device includes the above described low-μ road evaluation device through which the controlling means executes a four-wheel drive torque distribution if the low-μ road evaluation device evaluates a road as having a low-μ.

In this specification, performing four-wheel drive torque distribution means that coupling is controlled in a way that the coupling engagement is increased compared to the current engagement. Also, performing two-wheel drive torque distribution means that coupling is controlled in a way that the coupling engagement is decreased compared to the current engagement.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

An embodiment in which the present invention is implemented in a four-wheel drive vehicle with a front-wheel drive based manual transmission.

Figure 1:
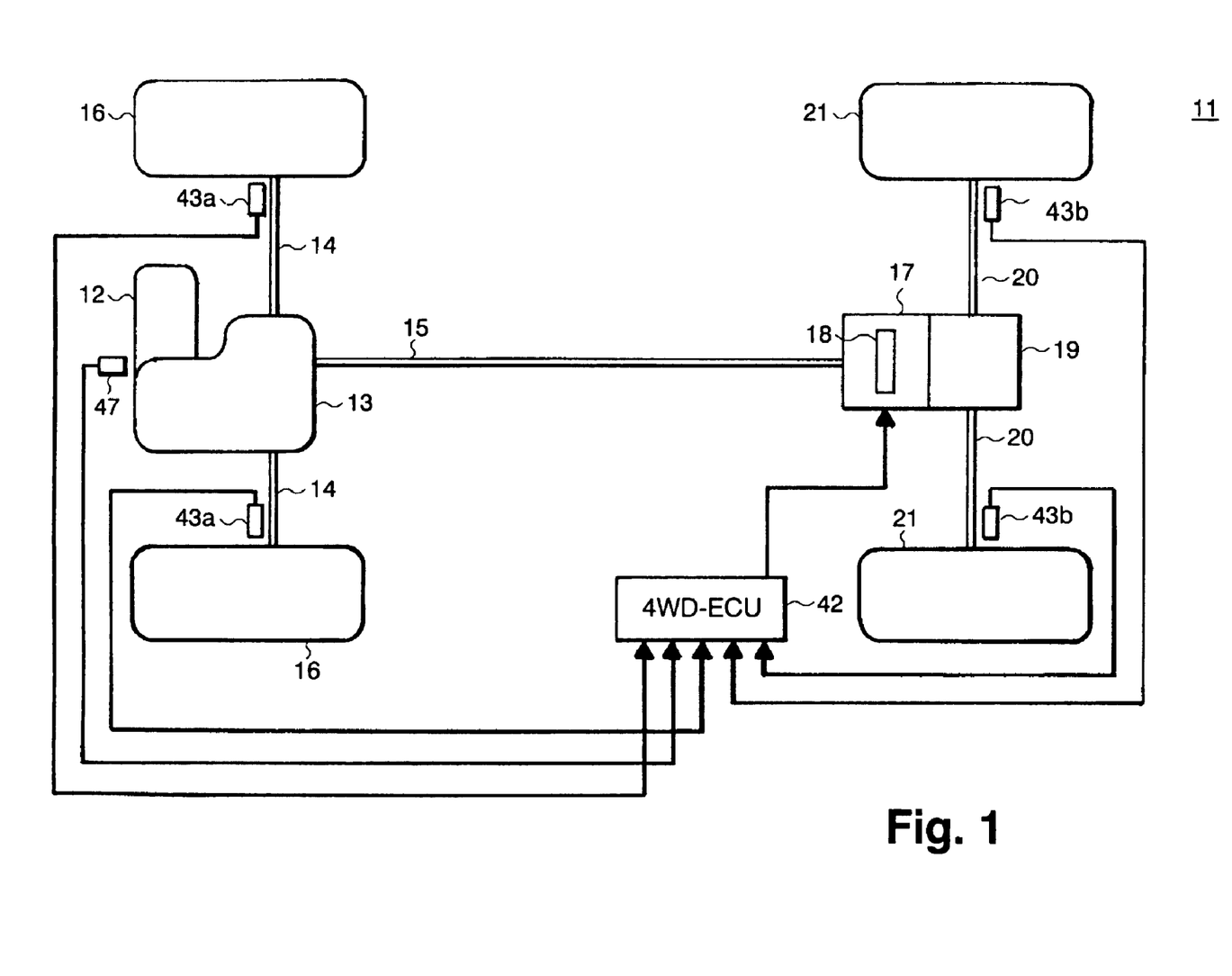
FIG. 1 is a simplified drawing of the structure of a four-wheel drive vehicle according to this embodiment.

FIG. 1 shows a simplified drawing of the structure of a four-wheel drive vehicle according to this embodiment.

As shown in FIG. 1, a four-wheel drive vehicle 11 is equipped with a transaxle 13 and an engine 12 serving as an internal combustion engine. The transaxle 13 includes a transmission, a transfer, and the like. The transaxle 13 is connected to a pair of front axles 14, 14 and a propeller shaft 15. Front wheels 16, 16 are connected to the front axles 14, 14 respectively. A power transfer device (coupling) 17 is connected to the propeller shaft 15, and a rear differential 19 is connected to the power transfer device 17 by way of a drive pinion shaft (not shown in the figure). The rear differential 19 is connected to rear wheels 21, 21 by way of a pair of rear axles 20, 20.

The power from the engine 12 is transferred to the front wheels 16, 16 by way of the trans axle 13 and the front axles 14, 14. Also, when the propeller shaft 15 and the drive pinion shaft are connected to each other by the drive transfer device 17 so that torque can be transferred, the power from the engine 12 is transferred to the rear wheels 21, 21 by way of the propeller shaft 15, the drive pinion shaft, the rear differential 19, and the rear axles 20, 20.

The drive transfer device 17 is equipped with a wet, multiple-disc electromagnetic clutch mechanism 18. The electromagnetic clutch mechanism 18 includes multiple clutch discs (not shown in the figure) that are either frictionally engaged or are separated from each other. When a current based on an electrical current instruction value is sent to an electromagnetic coil (not shown in the figure) disposed inside the electromagnetic clutch mechanism 18, the clutch plates frictionally engage and torque is transferred to the rear wheels 21. When the current based on the electrical current instruction value to the electromagnetic clutch mechanism 18 is shut off, the clutch plates disengage from each other and transfer of torque to the rear wheels 21 is shut off.

The four-wheel drive vehicle 11 is equipped with a power distribution control device (4WD-ECU) 42 serving as control means.

The frictional engagement between the clutch plates increases according to the magnitude of the current (strength of the current) sent to the electromagnetic coil in the electromagnetic clutch mechanism 18, thereby allowing adjustments to be made to the torque transfer to the rear wheels 21, i.e., the constraint to the rear wheels 21 (the frictional engagement in the electromagnetic clutch mechanism 18). The turning on and off of current to the electromagnetic coil in the electromagnetic clutch mechanism 18 and adjustments to the magnitude of the current are controlled by the power distribution control device 42. In other words, the power distribution control device 42 selects either the four-wheel drive state or the two-wheel drive state and, in four-wheel drive, controls the power distribution rate (torque distribution rate) for the front wheels 16 and the rear wheels 21.

The torque distribution rate is front wheels=: rear wheels 100:0 when the torque transfer of the electromagnetic clutch mechanism 18 is shut off. When the electromagnetic clutch mechanism 18 forms a direct connection by being engaged at a value at or above a predetermined threshold value, the torque distribution corresponding to the ground load, i.e., the torque distribution ratio is front wheel:rear wheel=50:50 when the ground load is front wheels:rear wheels=50:50 and there is no slipping at any of the four wheels. The power distribution control device 42 can, through control instructions, vary the distribution of torque transferred to the front wheels 16 and the rear wheels 21 within the range front wheels: rear wheels=100–50: 0–50.

The power distribution control device 42 is formed around a microcomputer equipped with a CPU, RAM, ROM, an I/O interface, and the like. The ROM stores various control programs executed by the power distribution control device 42 and various data, maps, and the like. The maps are determined ahead of time using experimental data and well-known theoretical calculations based on the vehicle model. The RAM expands the control program in the ROM and serves as a workspace for data used by the CPU to perform various calculations.

On the four-wheel drive vehicle 11 are attached a first wheel speed sensor 43a and a second wheel speed sensor 43b serving as wheel speed detecting means and a throttle setting sensor 47 serving as acceleration operation detecting means. The first and second wheel speed sensors 43a, 43b and the throttle setting sensor 47 are connected to the input side of the power distribution control device 42 (the input terminals of the I/O interface). The power transfer device 17 and an engine control device (not shown in the figures) are connected to the output side of the power distribution control device 42 (the output terminals of the I/O interface).

A first wheel speed sensor 43a is provided for each front wheel 16, and a second wheel speed sensor 43b is provided for each rear wheel 21. The speed of each individual wheel (hereinafter referred to as wheel speed) is detected separately. The throttle setting sensor 47 is connected to a throttle valve (not shown in the figure) and detects the setting of the throttle valve. The setting of the throttle valve corresponds to the amount of operation performed on the accelerator pedal (not shown in the figure) (acceleration operation magnitude).

The power distribution control device 42 calculates a vehicle speed V based on the detection signals from the first and second wheel speed sensors 43a, 43b, and calculates a throttle setting Od (acceleration operation magnitude) based on the detection signal from the throttle setting sensor 47.

The power distribution control device 42 determines how high the torque distribution during four-wheel drive should be, based on the driving conditions of the vehicle and on data stored ahead of time in the form of a power distribution map.

The control program stored in ROM has a two-wheel drive mode and multiple four-wheel drive modes. In a four-wheel drive mode, the power distribution provided by the power transfer device 17 is changed according to the driving conditions at the time. The ROM contains a power distribution map for calculating a current (current value) to be supplied to the electromagnetic coil in the electromagnetic clutch mechanism 18 according to different driving conditions. The data in this map is used to determine current values to send to the electromagnetic coil so that a frictional engaging force is provided that results in a power distribution ratio that is appropriate to the driving conditions at the time. This driving condition has the following as parameters: a difference $\Delta N$ between the average wheel speed of the left and right front wheels 16 and the average wheel speed of the left and right rear wheels 21; the throttle setting Od; and the vehicle speed V. According to the data in the map described above, the four-wheel drive torque distribution is higher for times when there is acceleration compared to when the vehicle speed is fixed.

Figure 2:
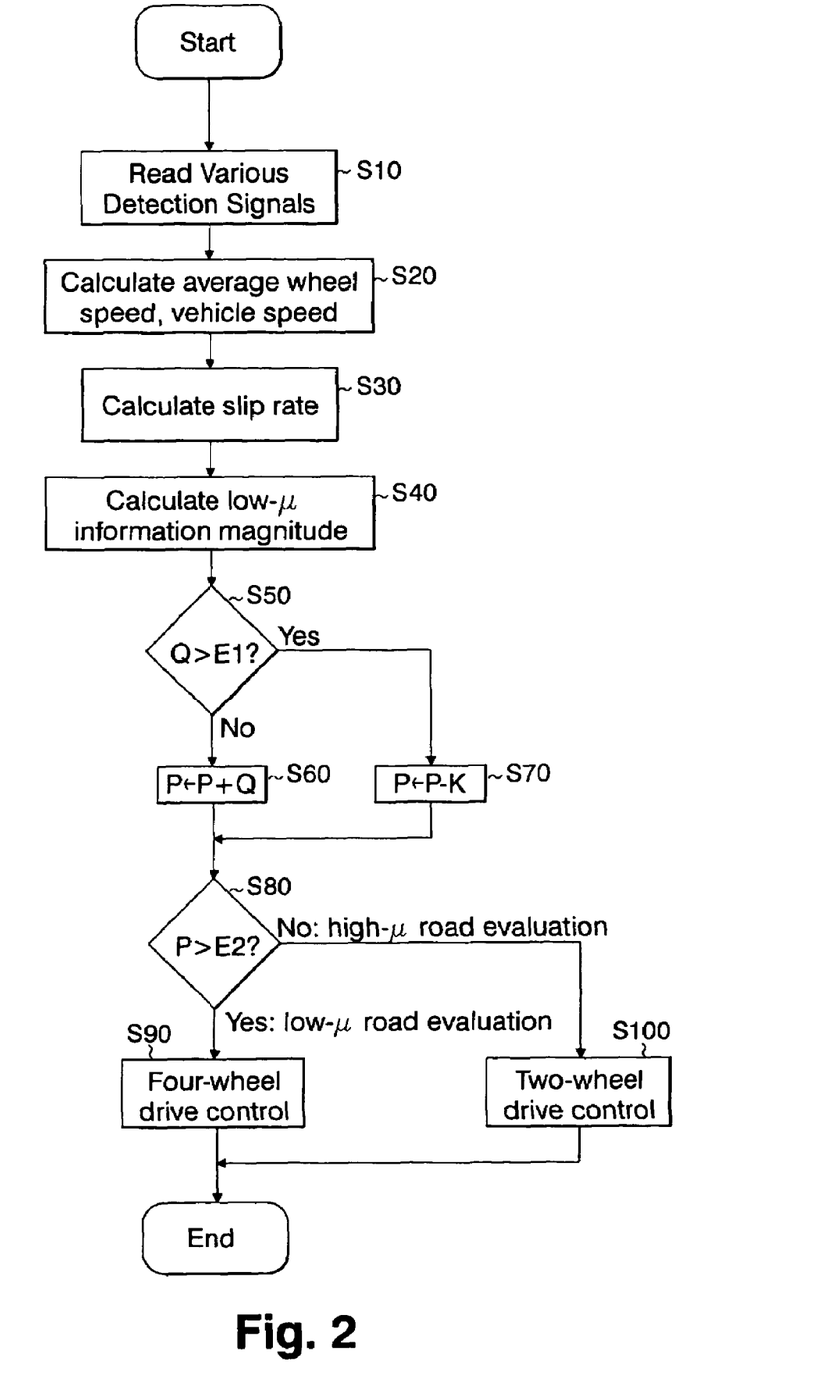
FIG. 2 is a flowchart illustrating operations.

Next, the operations of the power distribution control device 42 for four-wheel drive vehicles will be described using the flowchart in FIG. 2.

In step S10, the power distribution control device 42 reads the wheel speed of the front wheels 16 (drive wheel speed) from the first wheel speed sensors 43a and reads the wheel speed of the rear wheels 21 (driven wheel speed) from the second wheel speed sensors 43b. Also, the power distribution control device 42 reads the throttle setting sensor 47 to determine the throttle setting Od to serve as the acceleration operation magnitude.

At step S20, the power distribution control device 42 inputs the wheels speeds read in step S10 from the wheel speed sensors on the front wheels 16 and the rear wheels 21, and calculates an average wheel speed Va for the left and right front wheels 16 and an average wheel speed Vb for the left and right rear wheels 21. The average Va will be referred to hereinafter as the drive wheel speed and the average Vb will be referred to hereinafter as the driven wheel speed. The vehicle speed V corresponds to the average Vb.

Also, a calculation is made to determine the difference $\Delta N$ (hereinafter referred to as the front/rear wheel speed differential) between the average wheel speed of the front wheels (the average of the left and right front wheel speeds) and the average wheel speed of the rear wheels (the average of the left and right rear wheel speeds).

At step S30, a slip rate R is calculated. More specifically, the slip rate is determined using the following equation.

Slip rate R=(drive wheel speed−driven wheel speed)/driven wheel speed

Figure 3:
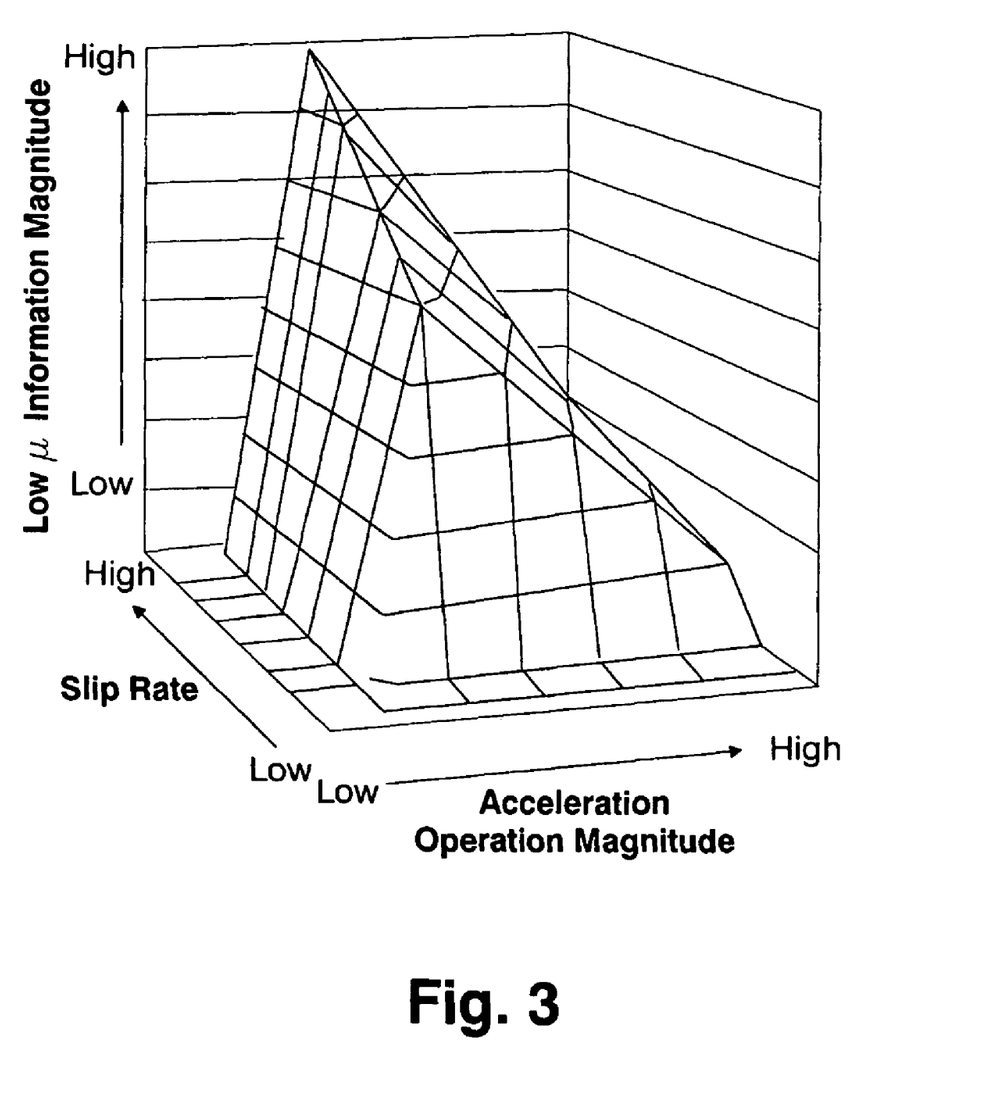
FIG. 3 is a map for slip rates, acceleration operation magnitudes, and low-μ information magnitudes.

At step S40, a low-μ information magnitude map stored ahead of time in ROM is used to calculate a low-μ information magnitude. As shown in FIG. 3, the low-μ information magnitude is a three-dimensional map that associates acceleration operation magnitude (the throttle setting Od in this embodiment), slip rate R, and a low-μ information magnitude Q associated with the friction coefficient of the road surface. In this embodiment, when the acceleration operation is low and the slip rate is high, the low-μ information magnitude Q is high. The low-μ information magnitude Q is calculated using this low-μ information magnitude map, the slip rate R calculated at step S30, and the throttle setting Od (acceleration operation) entered at step S10.

At step S50, a comparison is made between the low-μ information magnitude Q calculated at step S40 and an addition evaluation threshold E1, which is a first preset threshold value. The addition evaluation threshold E1 is stored ahead of time in ROM. The addition evaluation threshold E1 is used to prevent the current low-μ information magnitude obtained at step S40 from being added at step S60 if the low-μ information magnitude is less than the addition evaluation threshold E1. Low-μ information magnitude less than the addition evaluation threshold E1 is insufficient for determining that a road has a low-μ, e.g., when both the slip rate and the acceleration operation are low.

If, at step S50, the low-μ information magnitude exceeds the addition evaluation threshold E1, then the low-μ information magnitude Q is added to the low-μ counter P at step S60. If, at step S50, the low-μ information magnitude does not exceed the addition evaluation threshold E1, then a constant K is subtracted from the low-μ counter P at step S70. The constant K is a value set up ahead of time and stored in ROM.

Next, at step S80, the low-μ counter P on which either addition was performed at step S60 or subtraction was performed at step S70 is compared with a low-μ road evaluation threshold E2, which is a second preset threshold value. The low-μ road evaluation threshold E2 is stored ahead of time in ROM. The low-μ road evaluation threshold E2 is used to determine whether the current value of the counter P obtained from step S60 or step S70 exceeds the low-μ road evaluation threshold E2.

At step S80 if the counter P is found to exceed the low-μ road evaluation threshold E2, the road is determined to be a low-μ road and control proceeds to step S90. If, at step S80, the counter P is found to not exceed the low-μ road evaluation threshold E2, the road is determined to be a high-μ road and control proceeds to step S100.

At step S90, four-wheel drive control is performed in order to emphasize driving stability since step S80 resulted in a low-μ evaluation. More specifically, the power distribution control device 42 determines an electrical current instruction value based on data stored in the form of a power distribution map as well as driving conditions. This electronic current instruction value is output from the power distribution control device 42 to the power transfer device 17. As a result, coupling is controlled so that the coupling engagement is made greater than the current coupling engagement.

If a high-μ road evaluation is made at step S80, then two-wheel drive control is performed at step S100 in consideration of fuel consumption. More specifically, the power distribution control device 42 determines an electrical current instruction value based on data stored in the form of a power distribution map as well as driving conditions. This electronic current instruction value is output from the power distribution control device 42 to the power transfer device 17. As a result, coupling is controlled so that the coupling engagement is reduced compared to the current coupling engagement.

These calculations and instructions are repeated continuously from start-up to when driving is finished.

The power distribution control device 42 of this embodiment forms the low-μ road evaluation device and corresponds to slip rate calculating means, low-μ information magnitude calculating means, comparison evaluating means, adding means, subtracting means, and low-μ road evaluating means.

More specifically, step S30 corresponds to slip rate calculating means; step S40 corresponds to low-μ information magnitude calculating means; step S50 corresponds to comparison evaluating means; S60 corresponds to adding means; S70 corresponds to subtracting means; and S80 corresponds to low-μ road evaluating means.

Figure 4A:
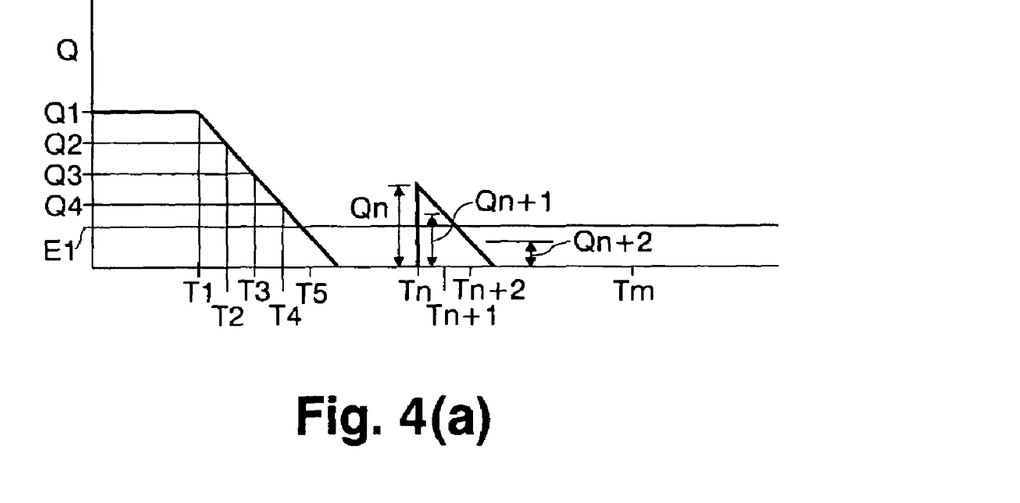
FIGS. 4(a), (b) are timing charts.
Figure 4B:
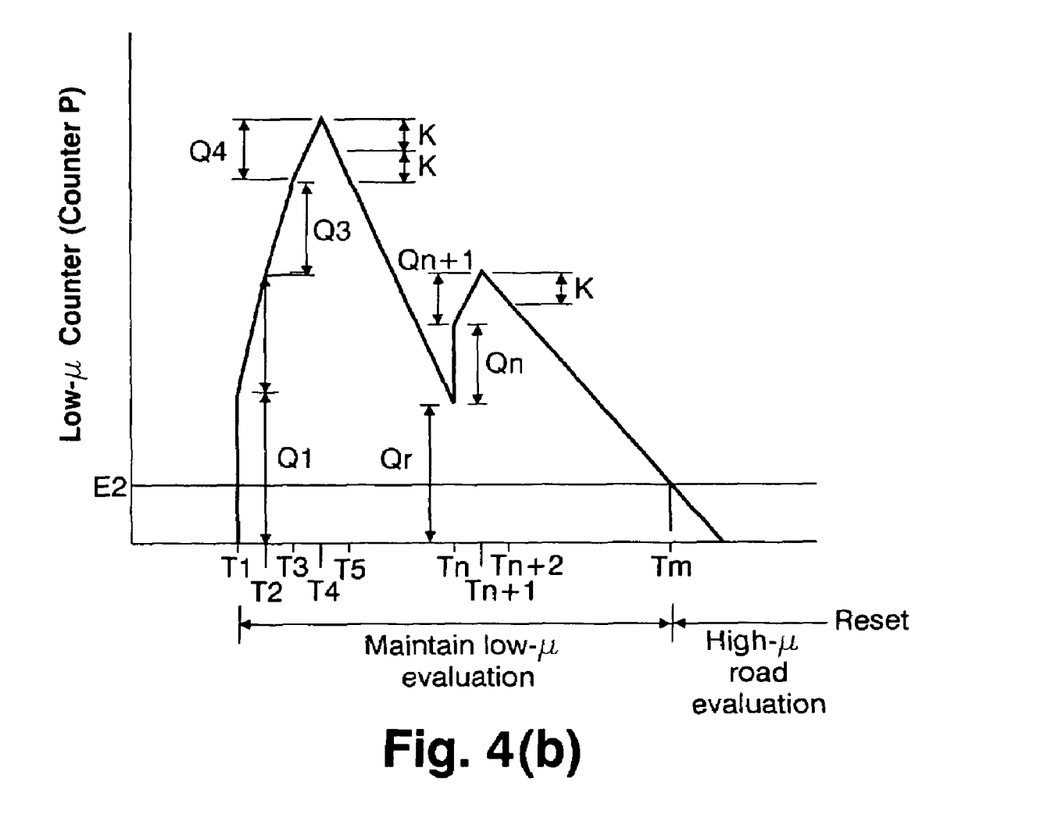

The operations performed in this embodiment will be described in detail, with references to the timing charts in FIG. 4(a), (b). In FIG. 4(a), the horizontal axis represents time axis T and the vertical axis represents the low-μ information magnitude Q. In FIG. 4(b), the horizontal axis represents time axis T and the vertical axis represents the low-μ counter value P. On the horizontal axis, T1, T2, and the like indicate when the flowchart described above is executed during each control cycle.

As shown in FIG. 4(a), if Q1–Q5 (Q1>Q2>Q3>Q4>E1>Q5) are obtained at T1-T5 as values for the low-μ information magnitude Q, in FIG. 4(b), the counter P would have the value Q1 at time T1, the value "Q1+Q2" at time T2, the value "Q1+Q2+Q3" at time T3, and the value "Q1+Q2+Q3+Q4" at time T4. However, at time T5, since E1>Q5, the counter P would be "Q1+Q2+Q3+Q4−K". The values for Q1–Q5 are variable and are obtained based on the slip rate and acceleration operations.

If the low-μ information magnitude Q obtained between time T5 and time Tn is at or less than the addition evaluation threshold value E1, the counter P would be reduced by the constant K at each control cycle, as shown in FIG. 4(b). Then, we assume that during Tn–Tn+2, if the low-li information magnitudes Q are Qn–Qn+2 (Qn>Qn+1>E1>Qn+2), and at time Tn the counter P has been reduced to Qr (>E2).

Then, referring to FIG. 4(b), the counter value P would be "Qr+Qn" at time Tn, "Qr+Qn+Qn+1" at time Tn+1, and "Qr+Qn+Qn+1−K" at time Tn+2. If the low-μ information magnitude is continuously 0 in subsequent control cycles, the counter value P would be at or less than E2 after time Tm, the low-μ road evaluation would be reset, and a high-μ road evaluation would result.

Thus, as shown in FIG. 4(b), if the low-μ information magnitude Q is found to momentarily be a high value that exceeds the addition evaluation threshold value E1 (e.g., at time T1 or time Tn), or if values exceed the addition evaluation threshold E1 multiple times continuously or intermittently, the counter value P continues to increase so that the accumulated value will be high. As the accumulated value (the counter P) increases, the time during which the low-μ road evaluation will be maintained will be longer even if subsequent low-μ information magnitude Q is continuously at or lower than the addition evaluation threshold value E1. Conversely, the smaller the low-μ information magnitude Q is for individual cycles, the smaller the total accumulated value (counter value) will be so that there will be a shorter time that low-μ road evaluations will be maintained before they are reset.

In particular, low-μ road evaluations will be maintained longer if the low-μ information magnitude Q is momentarily higher than the addition evaluation threshold value E1 (e.g., at time T1 or time Tn).

This embodiment provides the following advantages.

(1) The drive distribution control device 42 of this embodiment calculates the slip rate between wheels and the road surface, and uses the slip rate and the vehicle acceleration operation magnitude to calculate the low-μ information magnitude Q, which is associated with the friction coefficient of the road surface. The power distribution control device 42 also compares the calculated low-μ information magnitude Q with the addition evaluation threshold E1, and adds the low-μ information magnitude Q if the low-μ information magnitude Q exceeds the addition evaluation threshold E1. Furthermore, if the power distribution control device 42 determines that the low-μ information magnitude Q is at or less than the addition evaluation threshold value E1, the constant K (predetermined amount) is subtracted from the counter P. The power distribution control device 42 then compares the counter P to the low-μ road evaluation threshold E2, and a low-μ road evaluation is made if it exceeds the low-μ road evaluation threshold E2.

Thus, since low-μ road evaluations are performed based on the low-μ information magnitude Q which is associated with the friction coefficient of the road surface based on the slip rate and the acceleration operations of the vehicle, the low-μ road evaluation can be performed accurately with no mistaken evaluations unlike when low-μ road evaluations are performed only with slip rates or only with acceleration operations.

Also, if low-μ road surfaces and the high-μ road surfaces alternate continuously, the low-μ road evaluation can be disabled based on the friction coefficient of the low-μ road without having evaluations frequently switching between low-μ and high-μ. More specifically, a characteristic advantage is that if, as described above, the low-μ information magnitude Q is momentarily a high value compared to the addition evaluation threshold E1 (e.g., at time T1 or time Tn), the time during which the low-μ road evaluation is maintained can be long.

Also, the total accumulated value (counter value) is greater when the low-μ information magnitude Q for each cycle is higher, thus lengthening the time during which low-μ road evaluation is maintained before the low-μ road evaluation is reset. Conversely, if the low-μ information magnitude Q is smaller for each cycle, the accumulated value (counter value) is smaller, thus shortening the time during which low-μ road evaluation is maintained before the low-μ road evaluation is reset.

In other words, the interval during which a low-μ road evaluation is maintained is made variable according to the low-μ information magnitude, thus allowing low-μ road evaluations to be continued based on the low-μ information magnitude.

In the conventional structure 3, the low-μ road evaluation is reset if slips in which the slip rate does not exceed a predetermined value occur consecutively for a predetermined number of times. Thus, in the conventional structure 3, the interval during which a low-μ road evaluation is maintained is the time it takes for there to be the predetermined number of slips for which the slip rate does not exceed a predetermined value. Since the interval is not based on the friction coefficient of the low-μ road, the interval during which there is a low-μ road evaluation never increases or decreases.

Also, the power distribution control device 42 is equipped with a low-μ road evaluation device, thus providing stable four-wheel drive control based on the friction coefficient of low-μ roads.

(2) In this embodiment, at step S50, when there are consecutive cycles where the low-μ information magnitude Q is at or less than the addition evaluation threshold E1, then the counter P is reduced by the constant K at step S70, thus lengthening the time during which the low-μ evaluation is maintained (delay time) once a low-μ road evaluation is made. As a result, during this delay time, the low-μ road evaluation is maintained so that there are no changes between low-μ road evaluation and high-μ road evaluation. If a low-μ road continues either continuously or intermittently, the driver can drive without experiencing delays in control responsiveness. More specifically, if low-μ roads continue either continuously or intermittently, the present invention provides the advantage of offering high low-μ evaluation accuracy.

Implementations are not restricted to the embodiments described above. For example, the following changes can be made.

(1) In the above embodiment, the throttle setting Od was used as the acceleration operation magnitude, but it would also be possible to use the accelerator operation magnitude (e.g., how much the accelerator was depressed).

(2) In the above embodiment, the low-μ information magnitude Q itself is added to the counter P, but the present invention is not restricted to this. A value based on the low-μ information magnitude Q, e.g., a value having a proportional relationship, can be added to the counter or a value that increases as the low-μ information magnitude increases can be added to the counter P.

(3) The electromagnetic clutch mechanism 18 is used as a differential control device for the power transfer device 17, but it would also be possible to use another electronically controllable coupling format (e.g., a hydraulic clutch mechanism).

(4) The present invention can be implemented in a four-wheel drive vehicle equipped with a center-differential serving as the differential control device.

(5) The present invention can also be implemented in rear wheel drive based four-wheel drive vehicles. In this case, the power from the engine 12 is transferred from the rear wheels 21 to the front wheels 16.

(6) The present invention can also be implemented for RR-based four-wheel drive vehicles. In this case, the power from the engine 12 is transferred from the rear wheels 21 to the front wheels 16.

(7) The transmission can be an automatic transmission.

(8) The torque distribution is not restricted to being in the range front wheels: rear wheels=100:0 to front wheels: rear wheels=50:50. If the distribution to the rear wheels is greater than 0, the range could be, for example, between front wheels: rear wheels=80:20 and front wheels:rear wheels=50:50.

(9) The various sensor information can be entered by way of a multiplexed communication network (e.g., CAN).

(10) The present invention can be implemented for a power distribution control device driving driven wheels using an electrical motor or the like.

With the low-μ road evaluation device according to claim 1 through claim 4 as described above, the accuracy of low-μ road evaluations can be improved. Even if low-μ road surfaces and high-μ road surfaces alternate continuously, low-μ road evaluation can be disabled based on the friction coefficient of the low-μ road without having frequent switching between low-μ road evaluations and high-μ road evaluations.

The power distribution control device in claim 5 is equipped with a low-μ road evaluation device as described in any one of claim 1 through claim 4. As a result, stable four-wheel drive control based on the friction coefficients of low-μ roads can be provided.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A low-μ road evaluation device for controlling the distribution of power between the front and rear wheels of a four wheel drive vehicle comprising:
   slip rate calculating means for calculating a slip rate between a wheel of a vehicle and a road surface;
   low-μ information magnitude calculating means for calculating a low-μ information magnitude associated with a friction coefficient of said road surface, based on both of said slip rate and an acceleration operation magnitude derived from a throttle setting sensor in said vehicle;
   comparison evaluating means for comparing between said calculated low-μ information magnitude and a first preset threshold value;
   adding means for adding a value based on said low-μ information magnitude to a counter when said comparison evaluating means determines that said low-μ information magnitude exceeds said first preset threshold value;
   subtracting means for subtracting a predetermined value from the counter added to by said adding means when said comparison evaluating means determines that said low-μ information magnitude does not exceed said first preset threshold value; and
   low-μ road evaluating means for determining that there is a low-μ road when the counter calculated by said adding means or said subtracting means exceeds a second preset threshold value.

2. A low-μ road evaluation device according to claim 1 further comprising acceleration operation magnitude detecting means for detecting an acceleration operation magnitude of said vehicle.

3. A low-μ road evaluation device according to claim 1 wherein said low-μ information magnitude is a variable value based on said acceleration operation magnitude and said slip rate.

4. A low-μ road evaluation device according to claim 1 wherein said predetermined amount is a constant.

5. A power distribution control device for a four-wheel drive vehicle, comprising:
   controlling means for controlling a coupling force that transfers power generated by an internal combustion engine to front and rear wheels, based on driving conditions of said vehicle;
   slip rate calculating means for calculating a slip rate between a wheel of a vehicle and a road surface;
   low-μ information magnitude calculating means for calculating a low-μ information magnitude associated with a friction coefficient of said road surface, based on both of said slip rate and an acceleration operation magnitude derived from a throttle setting sensor in said vehicle;
   comparison evaluating means for comparing between said calculated low-μ information magnitude and a first preset threshold value;
   adding means for adding a value based on said low-μ information magnitude to a counter when said comparison evaluating means determines that said low-μ information magnitude exceeds said first preset threshold value;
   subtracting means for subtracting a predetermined value from the counter added to by said adding means when said comparison evaluating means determines that said low-μ information magnitude does not exceed said first preset threshold value; and
   low-μ road evaluating means for determining that there is a low-μ road when the counter calculated by said adding means or said subtracting means exceeds a second preset threshold value, wherein said controlling means performs four-wheel drive torque distribution when said low-μ road evaluation means evaluates a road as having a low-μ.

6. A method of evaluating a low-μ road, comprising the steps of:
  calculating a slip rate between a wheel and a road surface;
  calculating a low-μ information magnitude associated with a friction coefficient of said road surface, based on both of said slip rate and an acceleration value derived from a throttle setting sensor in said vehicle;
  comparing said low-μ information magnitude with a first preset threshold value;
  adding a value based on said low-μ information value to a counter when said low-μ information magnitude exceeds said first preset threshold value;
  subtracting a predetermined value from the counter when said low-μ information magnitude does not exceed said first preset threshold value; and
  determining that there is a low-μ road when the counter is evaluated to exceed a second preset threshold value.

7. The method according to claim 6, wherein calculating the slip rate comprises the steps of:
  reading speeds from front wheels and rear wheels of the vehicle;
  calculating an average speed of the front wheels and an average speed of the rear wheels; and
  taking the difference between the front wheel average speed and the rear wheel average speed and dividing the difference by the rear wheel average speed.

8. The method according to claim 6, wherein calculating the low-μ information magnitude comprises the steps of:
  calculating the acceleration value based on a signal from the sensor;
  determining, given the slip rate and the acceleration value, the low-μ information magnitude by referencing a predetermined low-μ information magnitude map which is a three-dimensional map that relates sup rate, acceleration value, and low-μ information magnitude.

9. The method according to claim 6, further comprising the steps of:
  selecting a four-wheel drive control process when the road is evaluated to be a low-μ road.

10. The method according to claim 6, further comprising the steps of:
  selecting a two-wheel drive control process when the road is evaluated not to be a low-μ road.

* * * * *